United States Patent
Anand et al.

(10) Patent No.: US 9,542,342 B2
(45) Date of Patent: Jan. 10, 2017

(54) SMART HOLDING REGISTERS TO ENABLE MULTIPLE REGISTER ACCESSES

(71) Applicant: CAVIUM, INC., San Jose, CA (US)

(72) Inventors: Vishal Anand, Saratoga, CA (US); Harish Krishnamoorthy, San Jose, CA (US); Guy Townsend Hutchison, Santa Clara, CA (US)

(73) Assignee: Cavium, Inc., San Jose, CA (US)

( * ) Notice: Subject to any disclaimer, the term of this patent is extended or adjusted under 35 U.S.C. 154(b) by 49 days.

(21) Appl. No.: 14/521,359

(22) Filed: Oct. 22, 2014

(65) Prior Publication Data

US 2016/0117271 A1    Apr. 28, 2016

(51) Int. Cl.
G06F 12/00 (2006.01)
G06F 13/16 (2006.01)
G06F 9/52 (2006.01)
G06F 9/30 (2006.01)

(52) U.S. Cl.
CPC ....... *G06F 13/1663* (2013.01); *G06F 9/30098* (2013.01); *G06F 9/52* (2013.01)

(58) Field of Classification Search
CPC .... G06F 9/52; G06F 9/30098; G06F 13/1663; G06F 13/16; G06F 9/30; G11C 11/40615; G11C 11/409; G11C 11/406
USPC ................. 711/104, 152, 151, 158
See application file for complete search history.

(56) References Cited

U.S. PATENT DOCUMENTS

| | | | |
|---|---|---|---|
| 6,076,146 A * | 6/2000 | Tran ..................... | G06F 9/30036 711/125 |
| 6,216,193 B1 * | 4/2001 | Lai ......................... | G06F 13/385 710/100 |
| 6,247,089 B1 * | 6/2001 | Kuo ....................... | G06F 13/385 710/309 |
| 8,054,744 B1 | 11/2011 | Bishara et al. | |
| 2005/0076228 A1 | 4/2005 | Davis | |
| 2008/0136829 A1 * | 6/2008 | Su .......................... | G09G 5/363 345/520 |
| 2009/0198876 A1 * | 8/2009 | Lai ......................... | G06F 13/124 711/103 |
| 2013/0163475 A1 | 6/2013 | Beliveau | |
| 2014/0153443 A1 | 6/2014 | Carter | |

* cited by examiner

*Primary Examiner* — Pierre-Michel Bataille
(74) *Attorney, Agent, or Firm* — Haverstock & Owens LLP

(57) ABSTRACT

A multiple access mechanism allows sources to simultaneously access different target registers at the same time without using a semaphore. The multiple access mechanism is implemented using N holding registers and source identifiers. The N holding registers are located in each slave engine. Each of the N holding registers is associated with a source and is configured to receive partial updates from the source before pushing the full update to a target register. After the source is finished updating the holding register and the holding register is ready to commit to the target register, a source identifier is added to a register bus. The source identifier identifies the holding register as the originator of the transaction on the register bus. The N holding registers are able to simultaneously handle N register transactions. The max value of N is $2^n$, where n is the number of bits in the source identifier.

30 Claims, 4 Drawing Sheets

100

SOURCE 0 Try to get Semaphore (GRANTED)

SOURCE 1 Try to get Semaphore (REJECTED)

SOURCE 0, ADDR_X  →  Update end register X, bits 31:0.

SOURCE 0, ADDR_X + 4  →  Update end register X, bits 63:32.

SOURCE 0 Release Semaphore

SOURCE 1 Try to get Semaphore (GRANTED)

SOURCE 1, ADDR_Y  →  Update end register Y, bits 31:0.

SOURCE 1, ADDR_Y + 4  →  Update end register Y, bits 63:32.

SOURCE 1 Release Semaphore

| SOURCE 0, ADDR_X | → | Update holding register 0, bits 31:0. |
| SOURCE 1, ADDR_Y | → | Update holding register 1, bits 31:0. |
| SOURCE 1, ADDR_Y + 4 | → | Update holding register 1, bits 63:32. Push holding register 1 to end register Y. |
| SOURCE 0, ADDR_X + 4 | → | Update holding register 0, bits 63:32. Push holding register 0 to end register X. |

Fig. 3

SMART HOLDING REGISTERS TO ENABLE MULTIPLE REGISTER ACCESSES

FIELD OF INVENTION

The present invention relates to shared resource accesses. More particularly, the present invention relates to smart holding registers to enable multiple register accesses.

BACKGROUND OF THE INVENTION

Modern semiconductor devices have a large programmable space that is used to enable features and provide debugging. This programmable space is programmed by software running on a combination of on and off chip processors. The programmable space is divided into subsections based on functionality. The subsections are further partitioned into logical register definitions that correlate with a corresponding feature set of the subsection. The lowest level of the programmable space is dictated by logical features and can have variable data widths. The width of a processor interface to the programmable registers is dictated by specifications of a processor and interconnect technology used between the processor and the programmable space.

Due to recent trends of multi-threading, virtualization, and the like, there can be multiple accesses to the programming space. These may or may not be coming from the same physical processor, which can be problematic when a wider end register is being accessed simultaneously by multiple sources in a piece meal manner. For example, if two threads are trying to access a 200-bit end register through multiple 32-bit transactions, then there needs to be some mechanism and check to ensure that all the 200-bits are updated from the same original source.

Semaphores are used between the sources to ensure that only one source is accessing the end registers at any time. Current implementations use two techniques to ensure atomicity. The atomicity can be implemented purely in software in some shared memory or can be hardware assisted by use of a register which ensures atomicity across a RMW (read modify write) access.

One limitation of the semaphore mechanism is that it limits performance by controlling how many sources can simultaneously access the end registers. Acquiring the semaphore adds overhead to each register access. This overhead comes even when two sources are not accessing the same end register. Assume two sources, namely SOURCE 0 and SOURCE 1, are trying to access two 64-bit registers, namely X and Y. FIG. 1 illustrates an exemplary sequence of operations 100 using the semaphore mechanism, which demonstrates unnecessary overhead. Unnecessary overhead affects performance.

In some applications, two sources may not be sharing the same software code base, which makes implementing the same semaphore logic even harder. One example of this scenario is when customer software is running on an external processor, while a debugging software is running on an embedded software.

BRIEF SUMMARY OF THE INVENTION

A multiple access mechanism allows sources to simultaneously access different target registers at the same time without using a semaphore. The multiple access mechanism is implemented using N holding registers and source identifiers. The N holding registers are located in each slave engine. Each of the N holding registers is associated with a source and is configured to receive partial updates from the source before pushing the full update to a target register. After the source is finished updating the holding register and the holding register is ready to commit to the target register, a source identifier is added to a register bus. The source identifier identifies the holding register as the originator of the transaction on the register bus. The N holding registers are able to simultaneously handle N register transactions. The max value of N is $2^n$, where n is the number of bits in the source identifier.

In one aspect, a processor is provided. The processor includes target registers and N holding registers. Each of the N holding registers is associated with a source and is configured to receive partial updates from the source before pushing a full update to one of the target registers. The processor also includes a bus coupling the target registers and the N holding registers. When the bus is accessed by one of the holding registers, the bus includes a source identifier indicating the one of the N holding registers that the access is from.

In some embodiments, the N holding registers are located in a slave engine.

In some embodiments, the N holding registers simultaneously handle N register transactions.

In some embodiments, the target registers are implemented in SRAM. Alternatively, the target registers are implemented in flip-flops.

In some embodiments, the N holding registers are implemented in SRAM. Alternatively, the N holding registers are implemented in flip-flops.

In some embodiments, the source identifier is n-bits wide, and the maximum value of N is $2^n$.

In another aspect, a processor is provided. The processor includes target registers and N holding registers. The N holding registers include a first holding register and a second holding register. The first holding register and the second holding register are simultaneously accessed by a first source and a second source, respectively, without using a semaphore, to receive partial updates therefrom. The processor also includes a bus coupling the target registers and the N holding registers, wherein the bus includes a transaction. The processor also includes a source identifier added to the bus, wherein the source identifier indicates the originator of the transaction on the bus.

In some embodiments, the transaction is an access to one of the target registers, wherein the transaction is included in the bus after one of the first holding register and the second holding register has received all of the partial updates.

In some embodiments, after the first holding register receives all of the corresponding partial updates, the first holding register pushes all of its contents in the first holding register to one of the target registers.

In some embodiments, after the second holding register receives all of the corresponding partial updates, the second holding register pushes all of its contents in the second holding register to one of the target registers.

In some embodiments, the originator is one of the first holding register and the second holding register.

In some embodiments, the N holding registers are located in a slave engine.

In some embodiments, the N holding registers simultaneously handle N register transactions.

In some embodiments, the target registers are implemented in SRAM. Alternatively, the target registers are implemented in flip-flops.

In some embodiments, the N holding registers are implemented in SRAM. Alternatively, the N holding registers are implemented in flip-flops.

In some embodiments, the source identifier is n-bits wide, and the maximum value of N is $2^n$.

In yet another aspect, a method of implementing a processor is provided. The method includes accessing at least a portion of N holding registers simultaneously by a plurality of sources, without using a semaphore, such that each of the at least a portion of the N holding registers receives partial updates from a respective source. The method also includes when a last write to an accessed holding register is detected, updating a target register with contents that are in the accessed holding register, wherein the accessed holding register is one of the at least a portion of N holding registers.

In some embodiments, updating a target register includes pushing the contents to the target register from the accessed holding register.

A source of the plurality of sources can be software running on an on chip processor or can be software running on an off chip processor.

In some embodiments, the target registers are implemented in SRAM. Alternatively, the target registers are implemented in flip-flops.

In some embodiments, the N holding registers are implemented in SRAM. Alternatively, the N holding registers are implemented in flip-flops.

In some embodiments, the N holding registers are located in a slave engine.

In some embodiments, the method also includes, prior to updating a target register, accessing a bus and passing a source identifier through the bus, wherein the source identifier is associated with the accessed holding register.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 illustrates an exemplary sequence of operations using the semaphore mechanism.

FIG. 3 illustrates an exemplary sequence of operations using the multiple access mechanism in accordance with some embodiments.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

A multiple access mechanism allows sources to simultaneously access different target registers at the same time without using a semaphore. The multiple access mechanism is implemented using N holding registers and source identifiers. The N holding registers are located in each slave engine. Each of the N holding registers is associated with a source and is configured to receive partial updates from the source before pushing the full update to a target register. After the source is finished updating the holding register and the holding register is ready to commit to the target register, a source identifier is added to a register bus. The source identifier identifies the holding register as the originator of the transaction on the register bus. The N holding registers are able to simultaneously handle N register transactions. The max value of N is $2^n$, where n is the number of bits in the source identifier.

Figure 2:
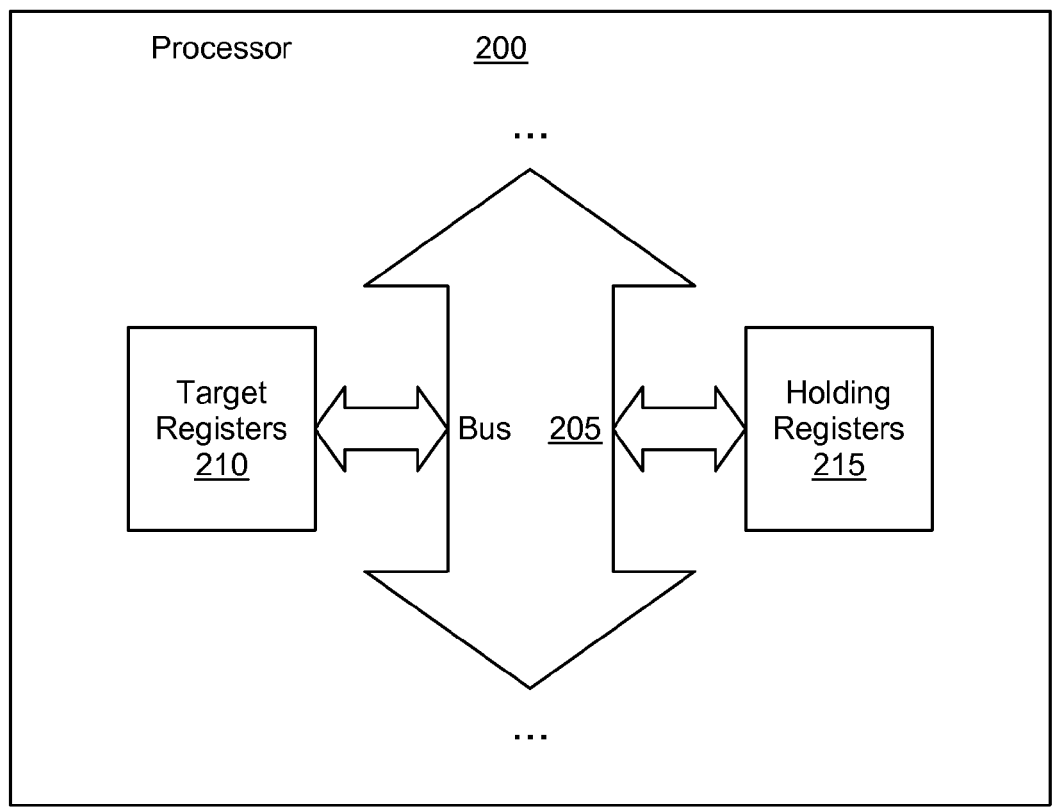
FIG. 2 illustrates an exemplary semiconductor chip in accordance with some embodiments.

The multiple access mechanism is typically implemented on a processor. FIG. 2 illustrates an exemplary processor 200 in accordance with some embodiments. The processor 200 includes target registers 210, holding registers 215 and at least one bus 205. The bus 205 couples the target registers 210 and the holding registers 215 together. In some embodiments, the target registers 210 are at a leaf level (e.g., in a slave engine). Each holding register 215 is as wide as a target register 210 and is configured to absorb partial updates from a source before committing the full update to the target register 210. A source can be software running on an on chip processor. Alternatively, a source can be software running on an off chip processor.

The registers 210, 215 can be implemented in SRAM. Alternatively, the registers 210, 215 can be implemented in flip-flops. The registers 210 can be implemented similarly as the registers 215. For example, both the registers 210 and the registers 215 are implemented in SRAM. Alternatively, the registers 210 can be implemented differently than the registers 215. For example, the registers 210 are implemented in SRAM and the registers 215 are implemented in flip-flops, or vice versa. The semiconductor chip 200 typically includes other electronic components, such as an ALU (algorithmic logic unit), which are not illustrated in FIG. 2 for the sake of clarity and simplicity.

When a source is trying to update a target register, the source first writes the content to a holding register. When the entire content is written to the holding register, the entire content is then pushed to the target register. Assume a 200-bit target register needs to be updated using 32-bit transactions. A processor, such as the processor 200, will issue seven write transactions. The address of each transactions increments in four-byte intervals. As such, to update the 200-bit target register, the updates will be issued to ADDR0, ADDR0+4, ADDR0+8, ADDR0+12, ADDR0+16, ADDR0+20, ADDR0+24. Each of these writes will be stored in a holding register. When the last write to ADDR_24 is detected, all of the contents of the holding register are transferred to the target register.

Now referring back to the previous example of the two sources—SOURCE 0 and SOURCE 1—trying to access 64-bit registers X and Y. One implementation of the semaphore mechanism of the prior art, as illustrated in FIG. 1, is using a global semaphore for the entire programmable space such that only one source is able to access the programmable space one at a time. Accordingly, when SOURCE 0 is updating register X, SOURCE 1 is unable to update register Y, even though register Y is a different end register than register X. It is only when SOURCE 1 is granted the semaphore after the semaphore is released can SOURCE 1 update register Y. This implementation is inexpensive in terms of resources, but since access is only allowed one at a time, concurrency is drastically reduced. Alternatively, another implementation of the semaphore mechanism of the prior art is using a semaphore per target register. This alternative implementation allows higher concurrency but is costly in terms of resources. In addition, the slave engine must wait to commit a write and continue processing until it can update a target register.

In contrast to the semaphore mechanism of the prior art, the multiple access mechanism allows multiple sources to simultaneously access different registers at the same time without requiring a semaphore. FIG. 3 illustrates an exemplary sequence of operations 300 using the multiple access mechanism in accordance with some embodiments. As illustrated in FIG. 3, the multiple access mechanism allows software of SOURCE 0 and SOURCE 1 to be independent of each other. Without using a semaphore, SOURCE 0 and SOURCE 1 can concurrently access register X and register Y at the same time. It should be noted that the above example has been generalized to two sources (N=2) and that the multiple access mechanism is applicable to two or more sources (N≥2).

Generally, during a write, a source first updates a holding register. When the source has completed updating the holding register, the holding register is ready to commit to a target register by accessing the bus. A source identifier is added to the bus by the slave engine. The source identifier indicates which holding register and source that the access is from. In other words, since there can be multiple transactions on the bus, a source identifier indicates the originator of a transaction on the bus such that register updates can occur in parallel. The entire content in the holding register is pushed to the target register.

A source identifier includes bits that are used to identify an originator of a transaction. For example, a 1-bit source identifier can be used to differentiate between two holding registers.

Figure 4:
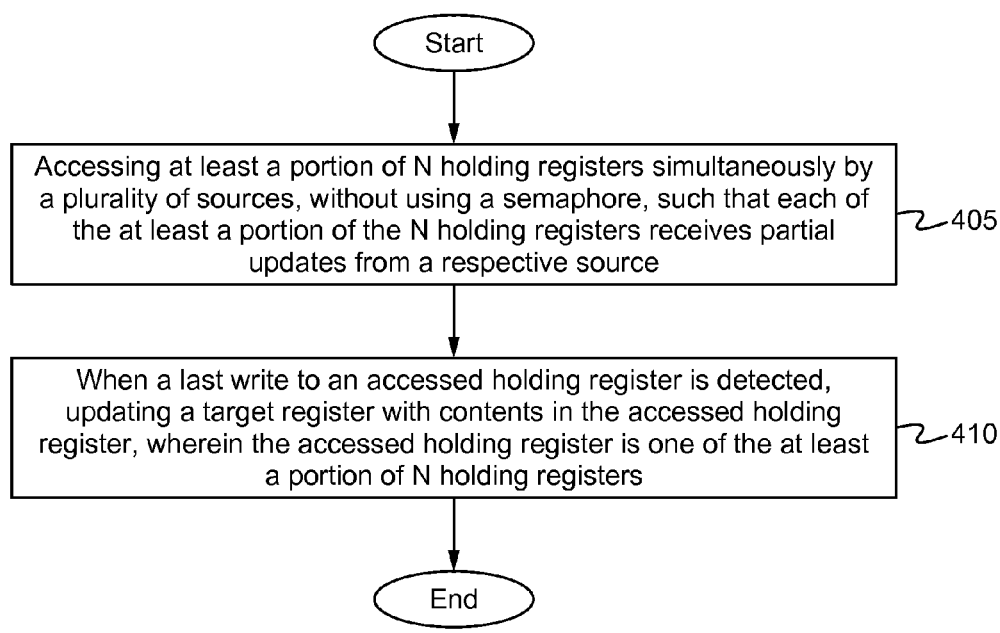
FIG. 4 illustrates an exemplary method of implementing a processor in accordance with some embodiments.

FIG. 4 illustrates an exemplary method 400 of implementing a processor in accordance with some embodiments. At a step 405, at least a portion of N holding registers are accessed simultaneously by a plurality of sources, without using a semaphore, such that each of the at least a portion of the N holding registers receives partial updates from a respective source. A source of the plurality of sources can be software running on an on chip processor or can be software running on an off chip processor.

At a step 410, when a last write to an accessed holding register is detected, a target register is updated with contents that are in the accessed holding register. The accessed holding register is one of the at least a portion of N holding registers. In some embodiments, the contents are pushed to the target register from the accessed holding register.

In some embodiments, prior to the step 410, a bus is accessed and a source identifier is passed through the bus. The source identifier is typically associated with the accessed holding register. In some embodiments, the source identifier is issued and passed by the slave engine to indicate that the accessed holding register is the originator of the transaction on the bus.

Similar to writes, during a read, a source identifier is added to the bus by the slave engine to ensure atomicity. When a target register is being read, no writes should occur at the target register until the target register is completely read.

The multiple access mechanism allows multiple sources to simultaneously access the programmable space at the same time without requiring a semaphore. The multiple access mechanism allows software of multiple sources to be independent of one another, which leads to better performance. Another advantage of the multiple access mechanism is that the slave engine only has to wait to commit to holding registers and not to target registers.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A processor comprising:
    target registers;
    N holding registers, wherein each of the N holding registers is associated with a source and is configured to refrain from pushing any subsets of an update received from the source to one of the target registers until all of the subsets of the update have been received from the source; and
    a bus coupling the target registers and the N holding registers, wherein when the bus is accessed by one of the holding registers, the bus includes a source identifier indicating the one of the N holding registers that the access is from.

2. The processor of claim 1, wherein the N holding registers are located in a slave engine.

3. The processor of claim 1, wherein the N holding registers simultaneously handle N register transactions.

4. The processor of claim 1, wherein the target registers are implemented in SRAM.

5. The processor of claim 1, wherein the target registers are implemented in flip-flops.

6. The processor of claim 1, wherein the N holding registers are implemented in SRAM.

7. The processor of claim 1, wherein the N holding registers are implemented in flip-flops.

8. The processor of claim 1, wherein the source identifier is n-bits wide, and the maximum value of N is $2^n$.

9. A processor comprising:
    target registers;
    N holding registers including a first holding register and a second holding register, wherein the first holding register and the second holding register are simultaneously accessed by a first source and a second source, respectively, without using a semaphore, to receive partial updates therefrom;
    a bus coupling the target registers and the N holding registers, wherein the bus transports a transaction; and
    a source identifier added to the bus, wherein the source identifier indicates the originator of the transaction on the bus.

10. The processor of claim 9, wherein the transaction is an access to one of the target registers, wherein the transaction is included in the bus after one of the first holding register and the second holding register has received all of the partial updates.

11. The processor of claim 9, wherein after the first holding register receives all of the corresponding partial updates, the first holding register pushes all of its contents in the first holding register to one of the target registers.

12. The processor of claim 9, wherein after the second holding register receives all of the corresponding partial updates, the second holding register pushes all of its contents in the second holding register to one of the target registers.

13. The processor of claim 9, wherein the originator is one of the first holding register and the second holding register.

14. The processor of claim 9, wherein the N holding registers are located in a slave engine.

15. The processor of claim 9, wherein the N holding registers simultaneously handle N register transactions.

16. The processor of claim 9, wherein the target registers are implemented in SRAM.

17. The processor of claim 9, wherein the target registers are implemented in flip-flops.

18. The processor of claim 9, wherein the N holding registers are implemented in SRAM.

19. The processor of claim 9, wherein the N holding registers are implemented in flip-flops.

20. The processor of claim 9, wherein the source identifier is n-bits wide, and the maximum value of N is $2^n$.

21. A method of implementing a register system, comprising:
    accessing at least a portion of N holding registers on a processor of a microchip simultaneously by a plurality of sources, without using a semaphore, such that each of the at least a portion of the N holding registers receives partial updates from a respective source; and
    when a last write to an accessed holding register is detected, updating a target register on the processor with contents that are in the accessed holding register, wherein the accessed holding register is one of the at least a portion of N holding registers.

22. The method of claim 21, wherein updating a target register includes pushing the contents to the target register from the accessed holding register.

23. The method of claim 21, wherein a source of the plurality of sources is software running on the processor.

24. The method of claim 21, wherein a source of the plurality of sources is software running on an off chip processor not within the microchip.

25. The method of claim 21, wherein the target register is implemented in SRAM.

26. The method of claim 21, wherein the target register is implemented in flip-flops.

27. The method of claim 21, wherein the N holding registers are implemented in SRAM.

28. The method of claim 21, wherein the N holding registers are implemented in flip-flops.

29. The method of claim 21, wherein the N holding registers are located in a slave engine.

30. The method of claim 21, further comprising, prior to updating a target register:
    accessing a bus; and
    passing a source identifier through the bus, wherein the source identifier is associated with the accessed holding register.

* * * * *